(12) United States Patent
Hilton et al.

(10) Patent No.: US 6,304,223 B1
(45) Date of Patent: *Oct. 16, 2001

(54) CONTACTLESS CARD AUTOMATIC CHECK-IN CHECK-OUT DEVICE

(75) Inventors: Graham H. Hilton, San Diego, CA (US); Alan Manley, Croydon (GB)

(73) Assignee: Cubic Corporation, San Diego, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,792

(22) Filed: May 12, 1999

(51) Int. Cl.[7] ..................................................... H01Q 1/24
(52) U.S. Cl. .................................... 343/702; 343/700 MS
(58) Field of Search ............................. 343/702, 700 MS; 325/846, 492; H01Q 1/24

(56) References Cited

U.S. PATENT DOCUMENTS

| | | |
|---|---|---|
| 5,253,162 | 10/1993 | Hassett et al. . |
| 5,500,517 * | 3/1996 | Cagliostro ............................. 235/486 |
| 5,714,741 * | 2/1998 | Pieterse et al. ....................... 235/380 |
| 5,841,122 * | 11/1998 | Kirchhoff ............................. 235/492 |

FOREIGN PATENT DOCUMENTS

| | | |
|---|---|---|
| 196 11 986 | 10/1996 | (DE) . |
| 298 15 975 | 11/1998 | (DE) . |
| 0 899 891 | 3/1999 | (EP) . |
| 0 919 945 | 6/1999 | (EP) . |
| 2 745 928 | 9/1997 | (FR) . |
| 2 755 303 | 4/1998 | (FR) . |
| 97/26629 | 7/1997 | (WO) . |
| WO 00/13127 | 3/2000 | (WO) . |

* cited by examiner

Primary Examiner—Hoang Nguyen
(74) Attorney, Agent, or Firm—Brown, Martin, Haller & McClain

(57) ABSTRACT

A device for communicating data with a contactless smart card in which a user initiates such communication by at least partially inserting the smart card through an entrance to a cavity of the device. The electromagnetic field produced by the device is largely confined to the cavity and largely oriented in a vertical direction. This structure prevents unintended communication with a smart card carried in a person's shirt pocket and minimizes potential health risks from exposure to the field. It also discourages users from moving the card too quickly into and out of the field for a transaction to complete.

14 Claims, 2 Drawing Sheets ent invention, will become more apparent
CONTACTLESS CARD AUTOMATIC CHECK-IN CHECK-OUT DEVICE

BACKGROUND OF THE INVENTION

1. Field of the Invention

The present invention relates generally to contactless smart cards and validator devices for communicating data with them and, more specifically, to validator devices used on board transit vehicles.

2. Description of the Related Art

Credit card-sized devices having memory, processing logic or other digital and analog electronics are commonly known as smart cards. Certain types of smart cards, commonly known as contactless smart cards, can communicate data with a validator device via a wireless radio frequency (RF), inductive or similar communication link that does not require electrical (galvanic) contact between the smart card and validator device. Smart farecards have been used for, among other purposes, payment of mass-transit fares. A patron can purchase a farecard having a certain denomination or value that corresponds to an account balance. To board a mass-transit vehicle, the patron places the farecard in the vicinity of the validator device. Via wireless or otherwise contactless communication between the validator and farecard, the validator device detects the presence of the farecard, identifies the account associated with that farecard, and debits the account balance. If the account balance is greater than the fare, the validator indicates such and allows the patron to board the vehicle. The transaction may include other steps as well, such as confirming the authenticity of the farecard. In some mass-transit systems, patrons must also present their farecards to the validator device upon exiting the vehicle. Such systems are sometimes referred to as check-in check-out (CICO) systems because a patron must use the validator both upon entering or checking into the vehicle and exiting or checking out of the vehicle. A CICO system can base the fare upon distance traveled, travel zones crossed or time elapsed.

Prior contactless CICO validator devices suffer from a number of problems. One problem is unintended check-out. Such a validator device is typically mounted at a height conveniently within the reach of a patron of average height. The device typically includes an antenna of a type and oriented in a manner that result in projection of an electromagnetic field in a generally horizontal direction. As a patron moves closer to the device the field thus becomes more intense. If a patron who has checked in stands too near the validator device during the ride, communication may occur between the validator device and a farecard in his shirt pocket, resulting in an unintended check-out transaction.

Another problem is that the RF field emanating from the validator device points directly at the patron. Although medical research has been inconclusive, it has been suggested that the cumulative effects of even very low energy RF fields can be harmful to persons, particularly those who have cardiac pacemakers.

Another problem is that a patron may withdraw the farecard before a check-in or check-out transaction has been completed. A typical smart card transaction takes between 100 and 300 milliseconds to complete. A patron may not appreciate how near the validator device he must bring the card and how long he must allow the card to remain there. An unknowledgeable patron may attempt to quickly wave the card by the validator device. Although a display or similar indicator on the validator device may alert the patron that the transaction did not complete, a patron may not deduce from such an indication that he should move the card more slowly or bring it closer to the device.

It would be desirable to provide a smart card validator device that inhibits unintended transactions with smart cards near the device, that promotes proper placement of a card when a transaction is intended, and that minimizes potential health risks from exposure to stray RF fields. These problems and deficiencies are clearly felt in the art and are solved by the present invention in the manner described below.

SUMMARY OF THE INVENTION

The present invention relates to a device for communicating data with a contactless smart card in which a user initiates such communication by at least partially inserting the smart card through an entrance to a cavity of the device. The cavity may be formed in the exterior surface of the housing of the device. In such embodiments of the invention the entrance to the cavity is bounded by the surrounding exterior walls of the housing. In other embodiments, the target area or entrance to the cavity may be defined by any other suitable boundary structure. The device includes an antenna that produces an electromagnetic field at least partially within the cavity. The device may be used for fare collection in mass-transit systems or other suitable environments.

The device may be mounted in an orientation in which the entrance to the cavity is oriented horizontally. Thus, to initiate communication between the smart card and the device, a user inserts the card into the target area or entrance to the cavity from a generally horizontal direction. Preferably, the antenna directs the electromagnetic field in a primarily vertical direction, i.e., transverse to the depth of the cavity. A smart card carried in the shirt pocket of a person who may be standing at a position horizontally displaced from the device is unlikely to communicate with the device because the field is not projected horizontally to any substantial extent. Furthermore, a user is unlikely to move the card too quickly into and out of the target area because placing the card into the target area requires a very deliberate movement. Also, potential health risks from exposure to RF energy are minimized because the field is not projected directly at the user.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF A PREFERRED EMBODIMENT

Figure 1:
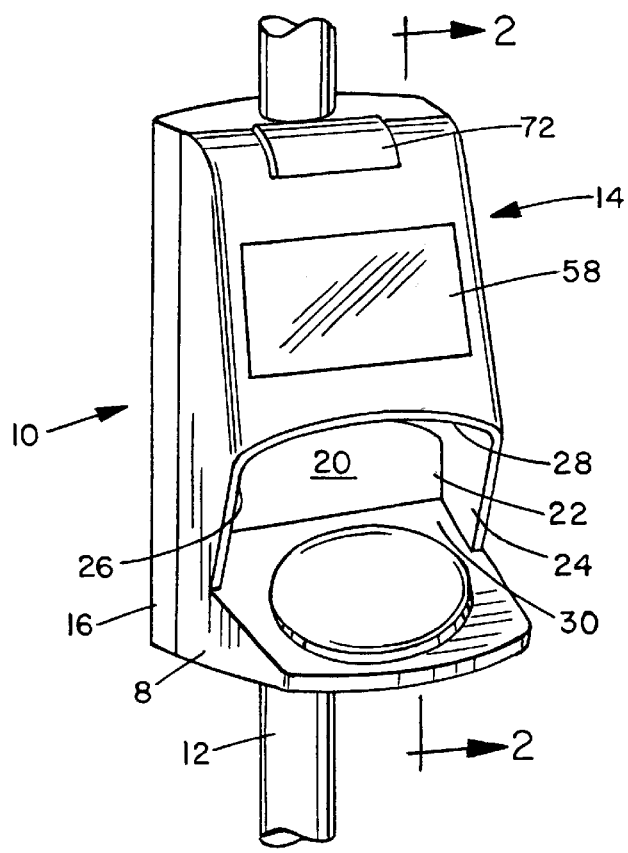
FIG. 1 is a perspective view of device for communicating data with a contactless smart card.

As illustrated in FIG. 1, a validation device 10 is mounted on a pole 12 in a mass-transit vehicle at a suitable height conveniently within the reach of a typical person, such as about four feet (122 cm) above the floor. Device 10 includes a housing 14 having two housing portions 16 and 18 that engage one another and capture pole 12 between them. Housing portion 18 has a cavity 20 formed in its exterior surface. Cavity 20 has a cave-like shape defined by a rear wall 22, two side walls 24 and 26, a top wall 28 and a bottom wall 30. Although such walls are preferred, in other embodiments cavity 20 may have any other suitable structure.

Figure 2:
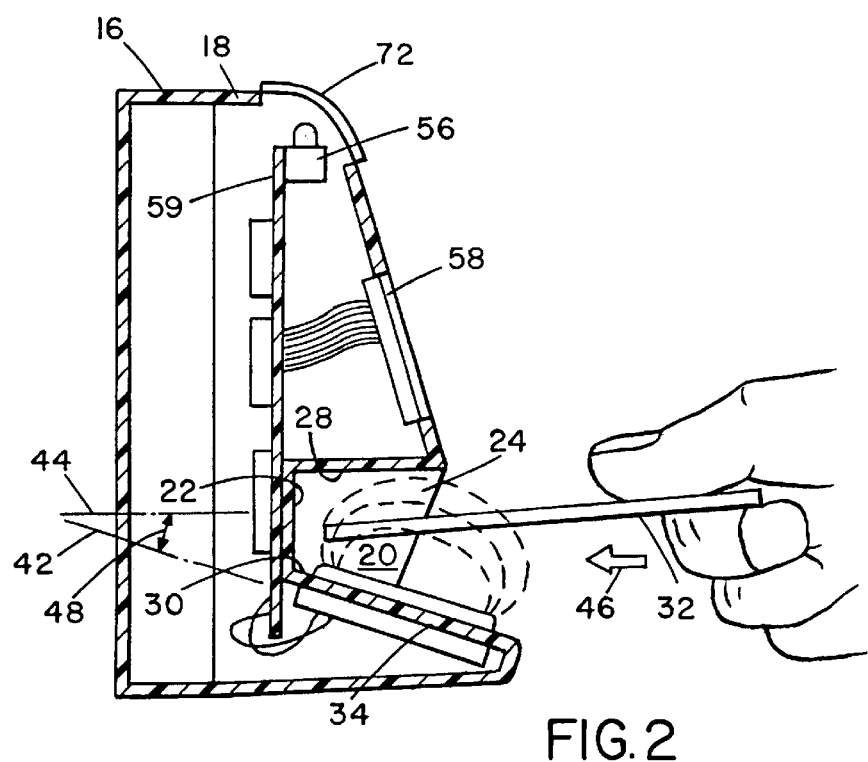
FIG. 2 is a sectional view taken on line 2—2 of FIG. 1.
Figure 3:
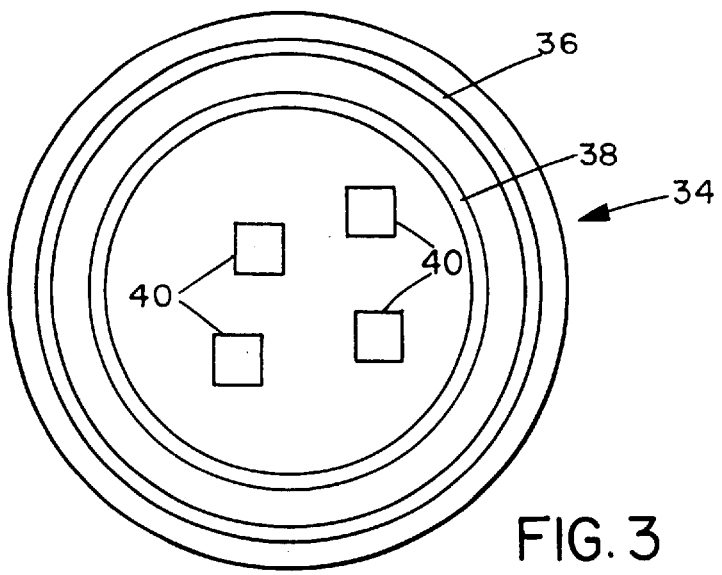
FIG. 3 is a top plan view of an antenna of the device.

As illustrated in FIG. 2, the entrance to cavity 20 bounds a target area into which a user inserts a farecard 32 to initiate a check-in or check-out transaction. Device 10 also includes an antenna 34 that is mounted inside housing portion 18 adjacent bottom wall 30. Although other structures may be suitable, antenna 34 preferably has the structure illustrated in FIG. 3. As illustrated in FIG. 3, antenna 34 is a circular, planar, printed circuit antenna having two concentric circular conductors 36 and 38. Circuit elements 40 are mounted on the printed circuit substrate and coupled to conductors 36 and 38 in the conventional manner. Such antenna structures and associated circuit elements are well-known to persons of skill in the art to which the invention relates. With reference to FIG. 2, antenna 34 produces a magnetic field (indicated in dashed line) that emanates in a direction away from the plane of antenna 34 into cavity 20. The magnetic field thus emanates perpendicularly to an antenna axis 42 in the plane of antenna 34.

Antenna 34 is preferably oriented at an angle so that the majority of the magnetic field emanates in a direction perpendicular to the cavity axis 44 along which a user inserts farecard 32 into cavity 20. With device 10 mounted on pole 12 as shown, cavity axis 44 is horizontal, and the user inserts farecard 32 in a substantially horizontal motion, as indicated by the arrow 46 in FIG. 2. The angle 48 between cavity axis 44 and antenna axis 42 is preferably greater than zero degrees but less than about 45 degrees so that the majority of the field emanates perpendicularly to cavity axis 44. If angle 48 were substantially greater than 45 degrees, the majority of the field would emanate horizontally toward the user and cause the problems described above, including unintended communication with a farecard stored in a user's shirt pocket and potential health risks. The present invention minimizes the likelihood of such problems because the invention largely confines the field to cavity 20. The present invention also discourages a user from moving farecard 32 too quickly into and out of the field by requiring the user to extend farecard 32 at least partially into the entrance to cavity 20. A typical user is unable to guide farecard 32 through the entrance to cavity 20 and withdraw it from the entrance to cavity 20 in less than the 300 ms required for a typical transaction to complete.

Figure 4:
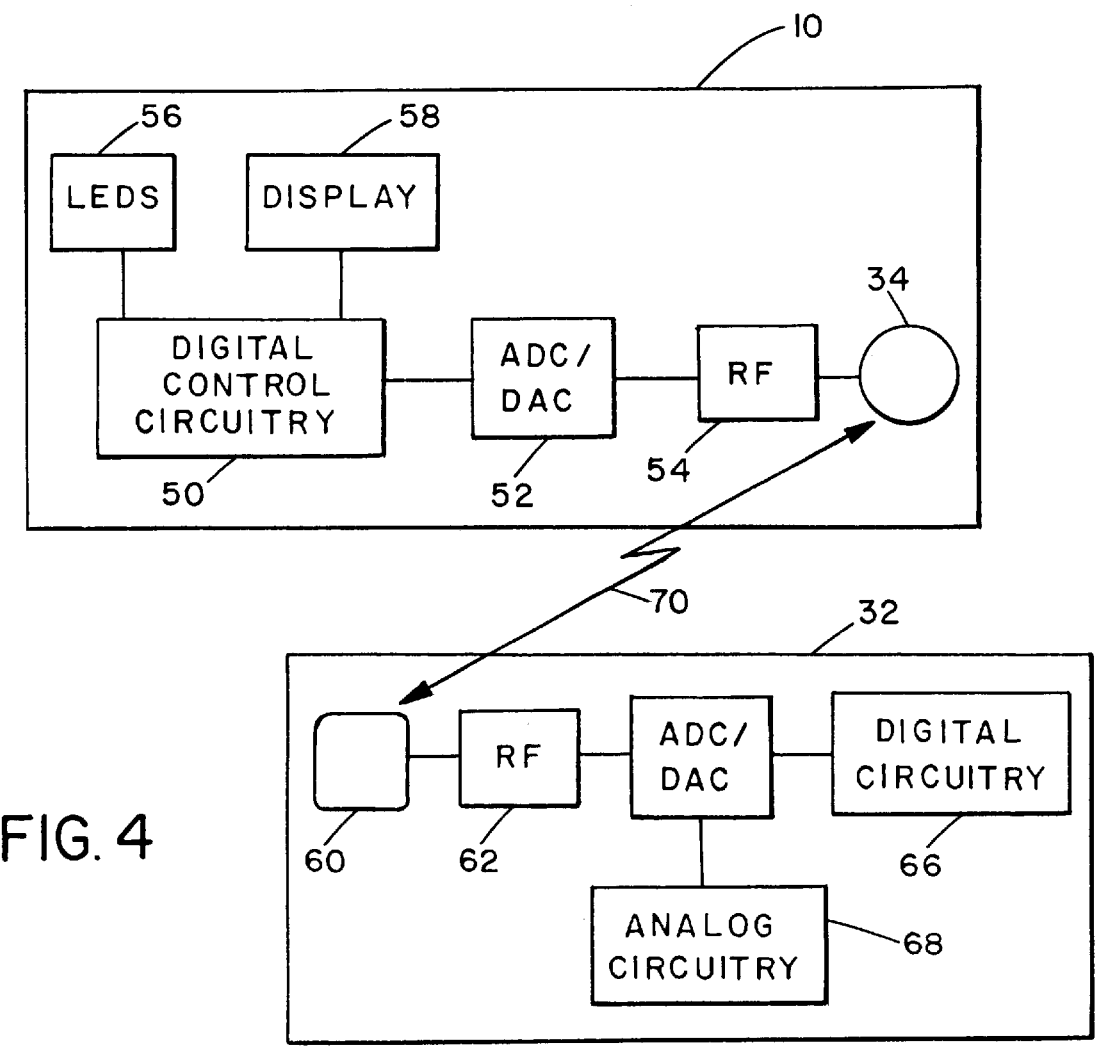
FIG. 4 is a block diagram illustrating the device communicating with the smart card.

When a user inserts farecard 32 into the field, device 10 initiates communication with it. As illustrated in FIG. 4, the electronics of device 10 include digital control circuitry 50, analog-to-digital and digital-to-analog converter circuitry 52, radio frequency amplification and detection circuitry 54, light-emitting diode (LED) indicators 56, and a liquid crystal display (LCD) 58. The circuitry and its functions are conventional and are therefore not described herein in further detail. Some of these electronics are embodied in a suitable circuit card 59 (see FIG. 2) and some are mounted on the circuit board substrate of antenna 34 as described above.

Farecard 32 includes a loop antenna 60, radio frequency amplification and detection circuitry 62, analog-to-digital and digital-to-analog converter circuitry 64, digital processing circuitry 66 and analog processing circuitry 68. This circuitry too is conventional and therefore not described in further detail. In general terms, however, via a resulting RF communication link 70 device 10 interrogates farecard 32, receiving fare and account balance information stored in farecard 32, and then updates information stored in farecard 32. For example, farecard 32 may have fare information and an account balance stored in non-volatile memory that is part of digital processing circuitry 66. Device 10 may determine whether the account balance is greater than the fare. If the account balance is greater, i.e., sufficient to pay for the fare, device 10 causes a green LED to illuminate and LCD 58 to display a corresponding message, such as "OK". Device 10 also debits the amount of the fare from the account balance stored on the card. If the account balance is sufficient for that fare but no further fares, device 10 causes a yellow LED to illuminate and LCD 58 to display a corresponding message, such as "LOW ACCOUNT BALANCE." If the account balance is insufficient, device 10 causes a red LED to illuminate and LCD 58 to display a corresponding message, such as "INSUFFICIENT ACCOUNT BALANCE." The LEDs, which are part of indicator 56, are visible to a user through a window bezel 72. Although not illustrated for purposes of clarity, device 10 may also communicate information with a central computer maintained by the transit system operator.

The present invention is particularly useful on mass-transit vehicles where patrons may be crowded near device 10, because the intensity of the electromagnetic field that reaches such patrons is insufficient to cause unintended communication with their farecards 32 or expose them to potential health risks. The present invention also encourages a patron to place farecard 32 in the target area for a sufficient amount of time for the transaction to complete.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A device for communicating data with a contactless smart card, comprising:
    a housing having a first axis in a substantially horizontal plane, the housing comprising:
        a front surface having an opening for accepting the contactless smart card;
        a back surface having means for mounting said housing;
        a cavity extending from the opening towards the back surface in a direction parallel to the first axis, the cavity comprising:
            a bottom surface adjacent the opening and sloping toward the opening at an angle with respect to the first axis; and
            and a top surface at least partially overhanging the bottom surface;
        an antenna parallel to the bottom surface of the cavity, the antenna producing an electromagnetic field at least partially within said cavity; and
        electronics coupled to the antenna for controlling data communication with the smart card via said antenna.

2. The device for communicating data with a contactless smart card as in claim 1, wherein:
    a majority of said electromagnetic field emanates from said antenna in a direction perpendicular to said first axis.

3. The device for communicating data with a contactless smart card as in claim 2, wherein the means for mounting said housing is a vertical conduit for accepting a pole in a mass-transit vehicle.

4. The device for communicating data with a contactless smart card as in claim 1, wherein said angle is greater than zero degrees and less than 45 degrees.

5. The device for communicating data with a contactless smart card as in claim 1, wherein said antenna is a printed circuit antenna.

6. The device for communicating data with a contractless smart card as in claim 5, wherein a conductor of said antenna is circular and defines a boundary for housing said electronics.

7. The device for communicating data with a contactless smart card as in claim 1, wherein the electromagnetic field is contained within the cavity.

8. A device for contactless smart card communication, the device having a mounting axis and a front surface, the device comprising:

a recessed area on the front surface for accepting the contactless smart card, the recessed area comprising:
   a rear wall parallel to the mounting axis;
   a first wall and second wall extending from the rear wall to the front surface, the first wall opposing the second wall and extending from the rear wall at an outwardly-opening angle;
an antenna mounted adjacent and parallel to the first wall for producing an electromagnetic field directed towards the second wall and contained within at least a portion of the recessed area; and
electronics coupled to said antenna controlling data communication with said smart card via said antenna.

9. The device recited in claim 8, wherein:

said device is oriented vertically with respect to said mounting axis and wherein said recessed area accepts said contactless smart card oriented horizontally; and wherein said second wall is an upper wall and said first wall is a lower wall vertically spaced from one another.

10. The device recited in claim 8, wherein said outwardly-opening angle is greater than zero degrees and less than about 45 degrees.

11. The device recited in claim 8, wherein said antenna is a printed circuit antenna.

12. The device recited in claim 11, wherein a conductor of said antenna is circular, and said electronics are positioned within a boundary of said conductor.

13. A method for communicating data with a contactless smart card, said method comprising the steps of:

providing a housing having a substantially "v"-shaped cavity with a first wall opposing a second wall, said "v"-shaped cavity having an interior area sufficient for moving said contactless smart card through said interior area;

providing an antenna for producing an electromagnetic field inside said "v"-shaped cavity, said antenna adjacent and parallel to one of said first and second walls;

mounting said device with said "v"-shaped cavity oriented horizontally;

producing said electromagnetic field at least partially within said "v"-shaped cavity;

inserting said contactless smart card into said "v"-shaped cavity utilizing a substantially horizontal motion; and detecting said insertion of said smart card through said "v"-shaped cavity;

wherein said device communicates with said contactless smart card via electronics coupled to said antenna.

14. The method as in claim 13, wherein the step of mounting said device comprises mounting said device with said "v"-shaped cavity oriented vertically, and wherein said step of inserting said contactless smart card comprises utilizing a substantially vertical motion.

* * * * *